(12) United States Patent
Liao et al.

(10) Patent No.: US 8,522,079 B2
(45) Date of Patent: Aug. 27, 2013

(54) SYSTEM AND METHOD FOR MULTI-CORE SYNCHRONOUS DEBUGGING OF A MULTI-CORE PLATFORM

(75) Inventors: Che-Yu Liao, Kaohsiung (TW);
Kuo-Cheng Lee, New Taipei (TW);
Po-Han Huang, Hsinchu County (TW);
Chi Wu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 234 days.

(21) Appl. No.: 13/108,942

(22) Filed: May 16, 2011

(65) Prior Publication Data

US 2012/0210103 A1    Aug. 16, 2012

(30) Foreign Application Priority Data

Feb. 16, 2011    (TW) .............................. 100105109 A

(51) Int. Cl.
*G06F 11/00*    (2006.01)

(52) U.S. Cl.
USPC .............................................. 714/27; 714/25

(58) Field of Classification Search
USPC .......................................................... 714/27
See application file for complete search history.

(56) References Cited

U.S. PATENT DOCUMENTS

| | | | |
|---|---|---|---|
| 6,154,856 A * | 11/2000 | Madduri et al. | 714/27 |
| 6,189,140 B1 * | 2/2001 | Madduri | 717/128 |
| 6,385,742 B1 | 5/2002 | Kirsch et al. | |
| 6,446,221 B1 * | 9/2002 | Jaggar et al. | 714/30 |
| 6,718,294 B1 * | 4/2004 | Bortfeld | 703/20 |
| 6,950,963 B1 * | 9/2005 | Parson et al. | 714/30 |
| 7,010,722 B2 | 3/2006 | Jahnke | |
| 7,113,820 B2 | 9/2006 | Schlegel et al. | |
| 7,152,186 B2 * | 12/2006 | Airaud et al. | 714/30 |
| 7,519,955 B2 | 4/2009 | Larson et al. | |
| 7,533,315 B2 | 5/2009 | Han et al. | |
| 7,613,966 B2 | 11/2009 | Edgar et al. | |
| 7,644,310 B2 * | 1/2010 | Kang et al. | 714/30 |
| 2005/0034017 A1 * | 2/2005 | Airaud et al. | 714/25 |
| 2007/0136047 A1 * | 6/2007 | Newman et al. | 703/28 |
| 2010/0174892 A1 * | 7/2010 | Steeb | 712/227 |

OTHER PUBLICATIONS

Huang et al., ICEBERG: An Embedded In-circuit Emulator Synthesizer for Microcontrollers, Design Automation Conference, 1999. Proceedings. 36th, pp. 580-585.

Jung et al., Reusable Embedded Debugger for 32bit RISC Processor Using the JTAG Boundary Scan Architecture, ASIC, 2002. Proceedings. 2002 IEEE Asia-Pacific Conference on, 2002, pp. 209-212.

(Continued)

*Primary Examiner* — Kamini Patel
(74) *Attorney, Agent, or Firm* — Jianq Chyun IP Office

(57) ABSTRACT

A system and a corresponding method for multi-core synchronous debugging of a multi-core platform including a plurality of cores are provided. The method includes the following steps. Transmit a core debugging instruction to one of the cores selected by a system debugging instruction or store a group setting included in the system debugging instruction according to the type of the system debugging instruction. Control every core in a group to start executing program instructions simultaneously according to another system debugging instruction. The group is a subset of the cores and the group setting indicates which ones of the cores are included in the group. Use a handshaking mechanism to control all cores of the group to enter a debug mode simultaneously when a debug event happens in any core of the group.

14 Claims, 6 Drawing Sheets

(56) References Cited

OTHER PUBLICATIONS

Agarwal et al., The KILL Rule for Multicore, Design Automation Conference, 2007. DAC '07. 44th ACM/IEEE, Jun. 4-8, 2007, pp. 750-753.

ITRI, PACDSP V3 Debugging System User Guide for PAC Duo JTAG Adapter, PAC Parallel Architecture Core, ITRI, Mar. 26, 2011, pp. 1-8.

* cited by examiner

SYSTEM AND METHOD FOR MULTI-CORE SYNCHRONOUS DEBUGGING OF A MULTI-CORE PLATFORM

CROSS-REFERENCE TO RELATED APPLICATION

This application claims the priority benefit of Taiwan application serial no. 100105109, filed Feb. 16, 2011. The entirety of the above-mentioned patent application is hereby incorporated by reference herein and made a part of this specification.

BACKGROUND OF THE INVENTION

1. Field of the Invention

The disclosure relates to a system and a method for multi-core synchronous debugging of a multi-core platform.

2. Description of Related Art

Many electronic devices use simpler processors as control centers Processors execute software to provide different functions of an electronic device During the process of developing software, a debugger must be used. FIG. 1 shows a conventional debugger, wherein a computer host 110 includes the software portion of the debugger. A target system 150 includes the hardware portion of the debugger and the processor for debugging.

In further detail, the debugger can be split into four layers as shown in FIG. 2. The integrated development environment (IDE) layer 220 is the debugger software executed by the computer host 110, which provides an interface for the user to operate and issue instructions. The driver layer 240 is a software driver located in the computer host 110 and converts the operating instructions of the user to a hardware protocol that is acceptable to the target system 150, such as the Universal Serial Bus (USB). The protocol converter layer 260 is located in the target system 150, and converts the signal from the driver layer 240 to the protocol used by the in-circuit emulator (ICE) layer 280, such as the Joint Test Action Group (JTAG) standard widely used in debuggers. The ICE layer 280 is an ICE located in the target system 150, which handles the debugging functions for the target processor.

During the debugging process, the user can set breakpoints and watchpoints through the user interface of the IDE layer 220, and then order the processor to start executing program instructions. A breakpoint designates the location of a programming instruction, while a watchpoint designates a memory location. The ICE of the target system 150 receives operating instructions from the user, including the setting of breakpoints and watchpoints. Whenever the processor executes the programming instruction designated by a breakpoint or accesses the memory location designated by a watchpoint, the ICE controls the processor to stop the processor from executing program instructions and enter a debug mode. During the debug mode, the user can read statuses of the processor, including contents of the memory and registers through the user interface and the ICE to determine if the program is running as expected and observe the problems if the program does not perform as expected. Through the user interface and the ICE, the user can correct the content of the memory and the register, correct the current breakpoints and watchpoints, or set new breakpoints and watchpoints. After the above actions, the user can issue another command so that the processor continues to execute program instructions in order to begin the next iteration of the debugging.

There is already a trend of multi-core processors. Labs have made multi-core platforms that include ten or more cores, or even a hundred cores, and some multi-core platforms are heterogeneous platforms that include cores of various types. Each core is equivalent to an independent processor, and each core requires an exclusive debugger. If there are twenty cores, this means there needs to be twenty debugger structures as shown in FIG. 2. The computer host 110 needs to execute twenty pieces of debugger software. Twenty user interface windows need to be opened. Twenty signals are required between the computer host 110 and the target system 150. In addition, the target system 150 needs twenty test access ports. This causes the debugger software to be very complicated and is harder to use, and increases the cost. If multiple cores are performing the same task, these cores have to begin the execution at the same time and enter the debug mode at the same time. Because the debug software of each core is respectively independent, and there is a time difference when the user operates the debugging software one by one, the synchronous requirement is difficult to achieve.

Currently there are three solutions for the integration and synchronization between the debugging systems for multi-core platforms.

The first solution is to serially concatenate the signals for all the cores and then input the concatenated signals to a single test access port. This way, all the cores can be controlled through only one testing port.

The second solution is to gather and schedule the operating instructions for debugging at the software level or the hardware level of the debugging system, which enables the cores to synchronously start and stop.

The third solution is to provide a debugging bus connected to each core after the test access port of the target system in order to achieve hardware integration.

SUMMARY OF THE INVENTION

The disclosure provides a system and a method for multi-core synchronous debugging of a multi-core platform, so as to integrate the software and hardware of debugging systems for multi-core platforms, and provide a mechanism of synchronous debugging for the cores.

The disclosure provides a system for multi-core synchronous debugging of a multi-core platform The system for multi-core synchronous debugging includes a plurality of cores. The system for multi-core synchronous debugging includes a system debugging interface, a plurality of handshaking interfaces, and a cross trigger network. When debugging the core, the system debugging interface first selects a core or sets a group according to a system debugging instruction. After selecting the core, a demultiplexer in the system debugging interface dispatches the core debugging instruction to the core designated by the aforementioned system debugging instruction. The user can use the core debugging instruction to debug the core.

In addition, the system debugging interface stores the group setting included in the system debugging instruction or controls the cores in a group to start executing their respective programming instructions. The group is a subset of the cores and the group setting indicates which ones of the cores are included in the group.

Each handshaking interface corresponds to one of the cores, and provides a handshaking mechanism for debug events between each core. The cross trigger network transmits the signals relating to the debug events between the handshaking interfaces corresponding to the group. When a debug event happens in any core of the group, the handshaking interface and the cross trigger network use the handshaking mechanism to control all cores of the group to simultaneously enter a debug mode.

The disclosure further provides a method for multi-core synchronous debugging for the multi-core platform. The method for multi-core synchronous debugging includes the following steps. Transmit a core debugging instruction to one of the cores selected by a system debugging instruction, or storing a group setting included in the system debugging instruction, according to the type of the system debugging instruction. Or according to the system debugging instruction, control the cores of a group to simultaneously start executing their respective programming instructions. When a debug event happens in any core of the group, use a handshaking mechanism to control all cores of the group to simultaneously enter a debug mode.

The system and method for multi-core synchronous debugging may be used in a homogenous or heterogeneous multi-core platform. The system and method not only provide integration on the user interface level, the software level and the hardware level, but also use the handshaking mechanism to synchronize core debugging. The integration and synchronization reduce production cost of the debugger, and are more convenient for the user.

Several exemplary embodiments accompanied with figures are described in detail below to further describe the disclosure in details.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
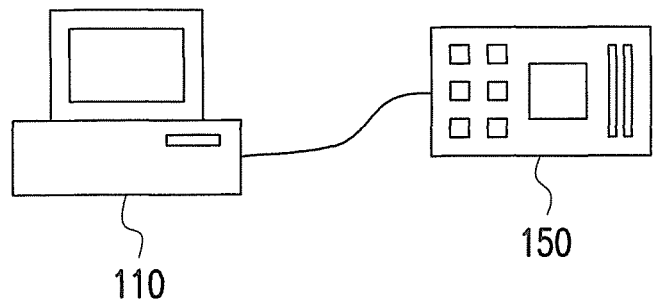
FIG. 1 and FIG. 2 are schematic diagrams of conventional debuggers.
Figure 2:
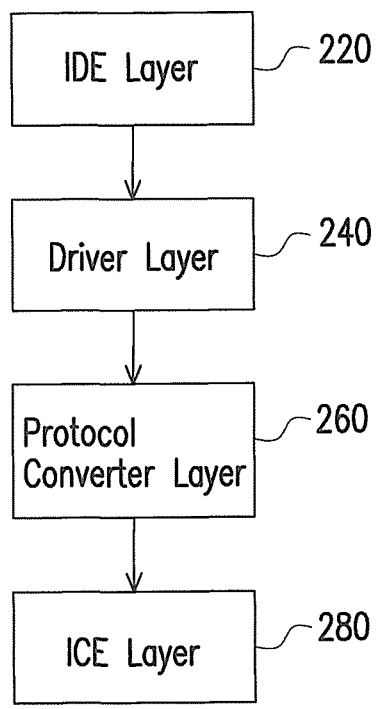
Figure 3:
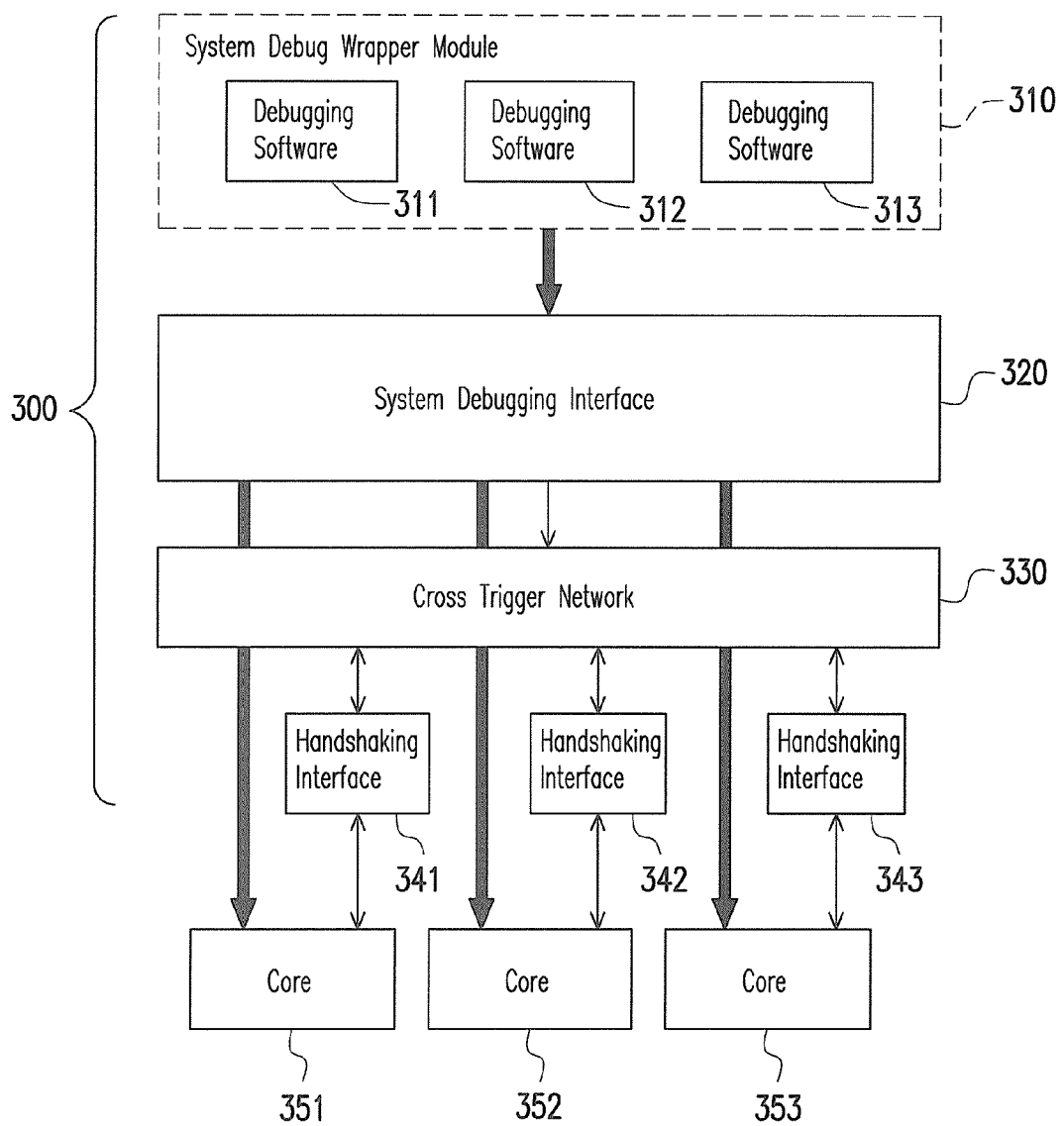
FIG. 3 is a schematic view of a system for multi-core synchronous debugging according to an exemplary embodiment of the disclosure.

FIG. 3 is a schematic view of a system 300 for multi-core synchronous debugging according to an exemplary embodiment of the disclosure. The system 300 for multi-core synchronous debugging may be used in a multi-core platform including a plurality of cores. For example, FIG. 3 shows the cores 351-353. Each of the cores may be a special processor such as digital signal processor (DSP), a general-purpose processor, or a data processing engine (DPE). The multi-core platform may be homogenous or heterogeneous. That is to say, the cores may all be the same. Alternatively, each core may be of different type.

The system 300 for multi-core synchronous debugging includes a system debug wrapper module 310, a system debugging interface 320, a cross trigger network 330, and a plurality of handshaking interfaces. For example, FIG. 3 shows the handshaking interfaces 341-343. In FIG. 3, only the system debug wrapper module 310 is software, and the rest are hardware components. The system debug wrapper module 310 provides a centralized interface, letting the user operate and give orders to control each core of the multi-core platform. The system debugging interface 320 is responsible for the debug signal integration of the multi-core, including selecting the debug core, and the synchronized start and stop of the multi-cores. The cross trigger network 330 and the handshaking interfaces 341-343 are responsible for the synchronization of the multi-core debug events. That is to say, when a debug event happens, such as a core executes a breakpoint or stores a watchpoint, a handshaking mechanism is used to make sure all the related cores stop simultaneously, and enter a debug mode. Each core of the multi-core platform has an exclusive ICE. These ICEs can be built in the corresponding core, or exist as a plug of a co-processor. The system 300 for multi-core synchronous debugging does not directly connect to each core, but connects to the ICE corresponding to the cores.

Figure 4:
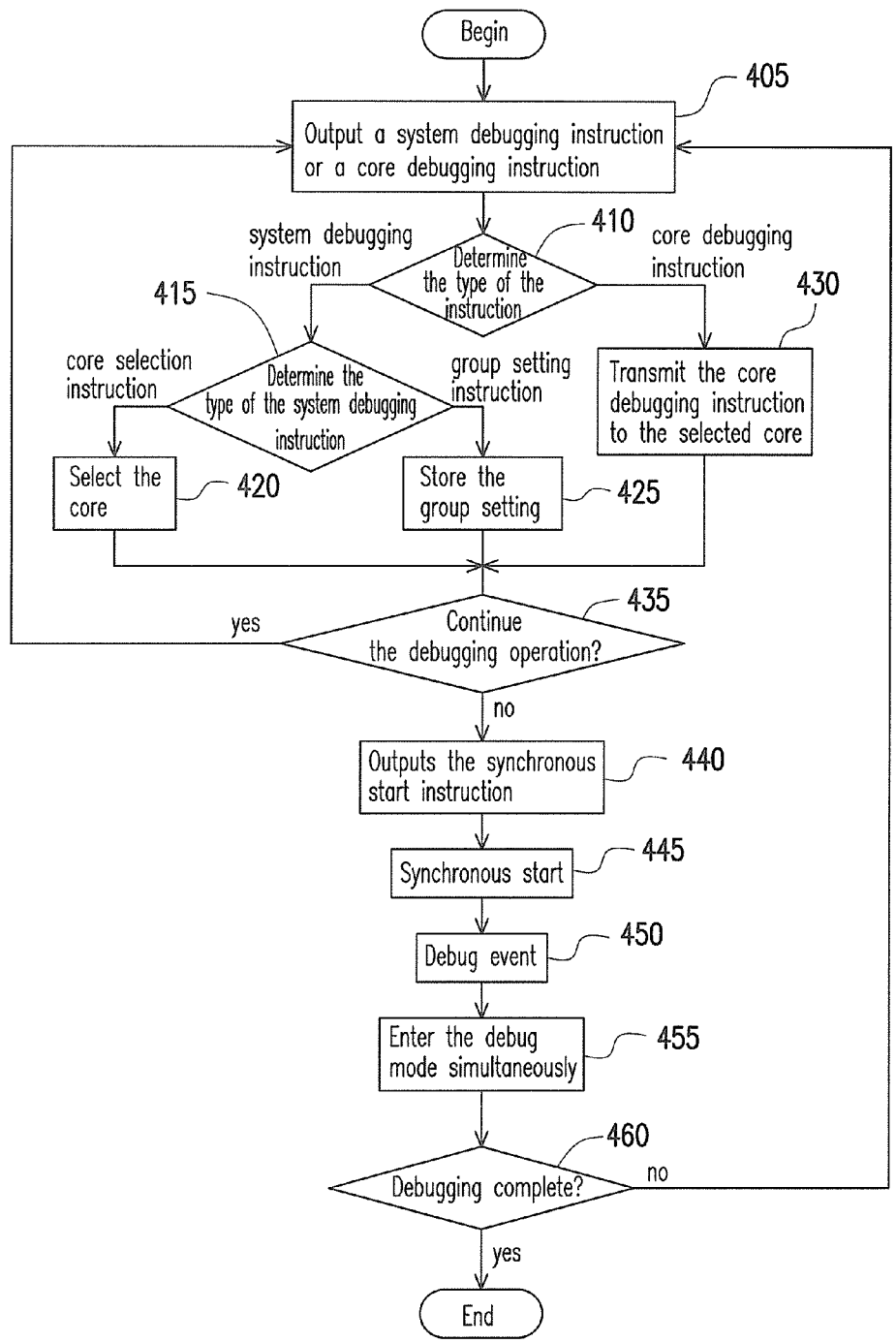
FIG. 4 is a flow chart of a method for multi-core synchronous debugging according to an exemplary embodiment of the disclosure.

FIG. 4 is a flow chart of a method for multi-core synchronous debugging according to an exemplary embodiment of the disclosure. The method can be executed through the system 300 for multi-core synchronous debugging, or through a similar hardware device. First, the system debug wrapper module 310 responds to the operation of the user and outputs a system debugging instruction directed to the system 300 for multi-core synchronous debugging, or a core debugging instruction directed to a core (step 405). The system debugging instructions can be divided into three types, namely, core selection instructions, group setting instructions, and synchronous start instructions.

Each core of the multi-core platform originally has a debug software. For example, the cores 351-353 of FIG. 3 have the corresponding debug software 311-313. The system debug wrapper module 310 wraps together the user interfaces of the original debug software of the cores to provide a centralized user interface for the user to operate on in order to control the system 300 for multi-core synchronous debugging and each core of the multi-core system. The system debug wrapper module 310 can receive the user operating instruction through the centralized interface. When the user issues an order directed to the operation of a core, such as reading or editing the contents of a register and memory of a core, or setting the breakpoints or watchpoints of a core, the system debug wrapper module 310 outputs a core selection instruction to select the core before outputting the core debugging instruction. After selecting the core for debugging through the system debugging interface 320, the system debug wrapper module 310 inputs the user operating instruction to the debug software 311-313 corresponding to the core, and outputs the core debugging instruction generated by the debug software. If the user continues to issue an operating instruction directed to the same core, then the system debug wrapper module 310 repeats the process of inputting the operating instruction to the debug software and outputs more core debugging instructions. If the user issues an operating instruction directed to another core, then the system debug wrapper module 310 repeats the process of outputting the core selection instruction to select another core. The core debugging instruction is transmitted to the core selected by the core selection instruction. The details will be discussed below.

The user may combine multiple cores into a group, wherein the group is a subset of the cores of the multi-core platform. Under the control of the system 300 for multi-core synchronous debugging, the cores of the same group can simultaneously start executing their respective program instructions. When a debug event happens in any core, all the cores of the same group simultaneously stop and enter a debug mode. If the user issues an operating instruction to set up a group, then the system debug wrapper module 310 outputs a group setting instruction. The group setting instruction includes the group setting that indicates which cores are included in the group.

When the user issues an instruction to simultaneously start all the cores in a group, then the system debug wrapper module 310 outputs a synchronous start instruction.

Next, the system debugging interface 320 receives the instruction from the system debug wrapper module 310, and determines whether the instruction is a system debugging instruction or a core debugging instruction (step 410). If it is a system debugging instruction, then the system debugging interface 320 decodes the system debugging instruction to determine the type of the system debugging instruction (step 415). If it is a core debugging instruction, then the system debugging interface 320 selects a core (step 420) so as to more conveniently process subsequent core debugging instructions. If it is a group setting instruction, then the system debugging interface 320 stores the group setting in the group setting instruction (step 425), so as to more conveniently process subsequent synchronous start instructions. If the step 410 determines the instruction from the system debug wrapper module 310 is a core debugging instruction, then the system interface 320 transmits the core debugging instruction to a core selected by the core selection instruction (step 430).

After steps 420, 425, and 430, the process moves on to step 435. If the user continues to proceed with the aforementioned operations, then the process reverts back to step 405. If the user issues an operating instruction for the group to synchronously start, then the system debug wrapper module 310 outputs the corresponding synchronous start instruction to the system debugging interface 320 (step 440). The system debugging interface 320 will similarly decode and determine the type of the synchronous start instruction. After confirming the synchronous start signal, the system debugging interface 320 sends signals according to the stored group setting to control the cores of the group to simultaneously start executing their respective programming instructions (step 445).

The handshaking interfaces 341-343 and the cores 351-353 have a corresponding relationship. The handshaking interfaces 341-343 provide a handshaking mechanism for debug events between the cores 351-353. The cross trigger network 330 transmits signals relating to the debug events between the handshaking interfaces corresponding to each group. When a debug event happens in any core of a group (step 450), the handshaking interface and the cross trigger network 330 use the handshaking mechanism to control all cores of the group to simultaneously enter a debug mode (step 455). At this point the user determines if the debugging is complete (step 460). If it is complete, then the process is finished, otherwise the process goes back to step 405, and the user can proceed with more debugging operations.

Figure 5:
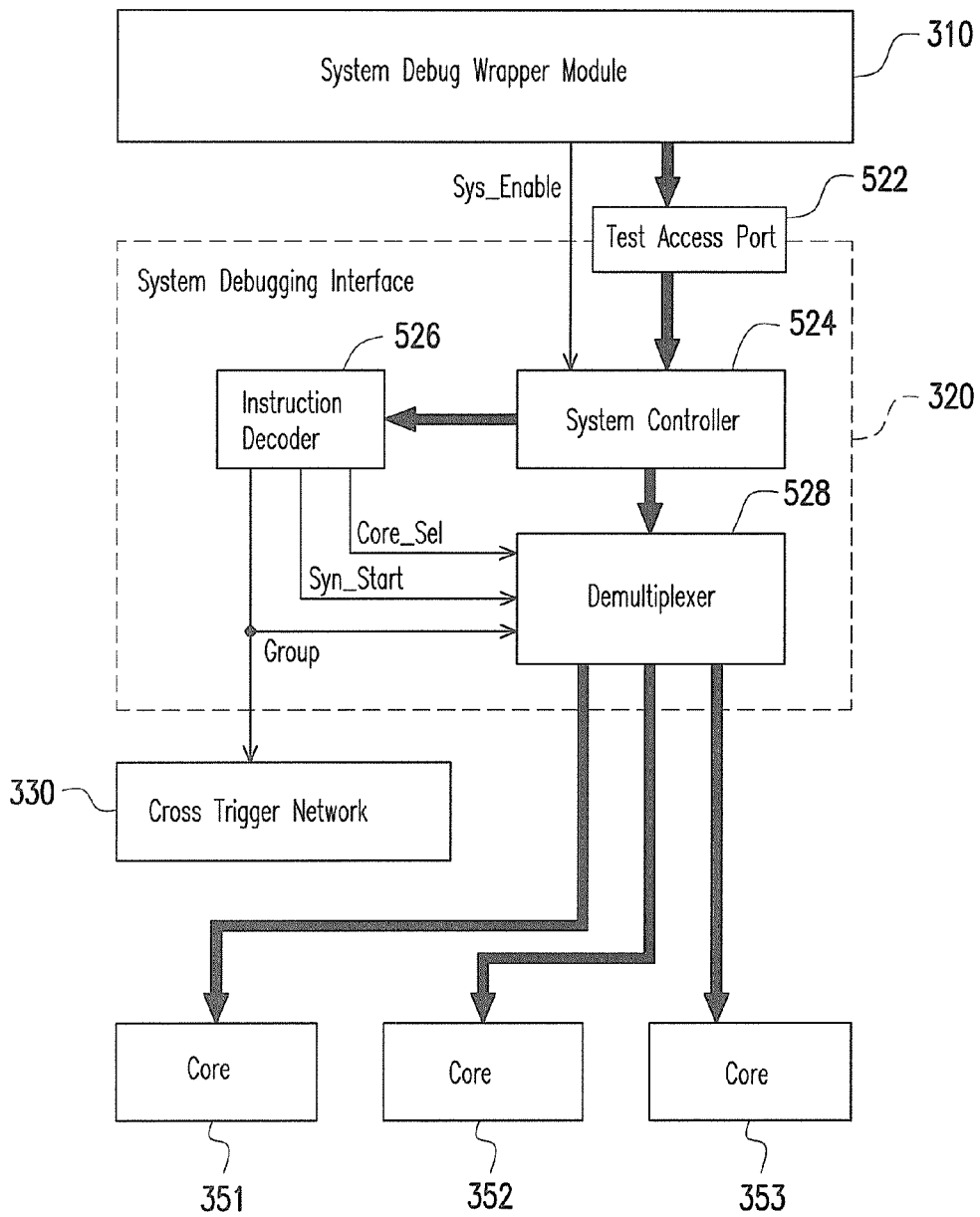
FIG. 5 is a schematic view of a system debugging interface according to FIG. 3 of an exemplary embodiment of the disclosure.

FIG. 5 is a structural schematic view of a system debugging interface 320 according to an exemplary embodiment of the disclosure. In the embodiment, the system debugging interface 320 includes a test access port (TAP) 522, a system controller 524, an instruction decoder 526, and a demultiplexer 528.

The test access port 522 receives the system debugging instruction and the core debugging instruction outputted by the system debug wrapper module 310, transmitting the two types of instructions to the controller 524. If the system 300 for multi-core synchronous debugging and cores 351-353 all support the JTAG standard, the test access port 522 may be a test access port conforming to the JTAG standard.

The system controller 524 receives the system debugging instruction, the core debugging instruction, and a system enable signal Sys_Enable from the system debug wrapper module 310. The system controller 524 differentiates the system debugging instruction and the core debugging instruction through the system enable signal Sys_Enable. When the system debug wrapper module 310 outputs the system debugging instruction, it sets up the system enable signal Sys_Enable. In response, the system controller 524 outputs the system debugging instruction to the instruction decoder 526. When the system debug wrapper module 310 outputs the core debugging instruction, it clears the system enable signal Sys_Enable. In response, the system controller 524 outputs the core debugging instruction to the demultiplexer 528.

The instruction decoder 526 receives the system debugging instruction from the system controller 524, and decodes the system debugging instruction to determine its type. If the system debugging instruction is a core selection instruction, then the instruction decoder 526 outputs the core selection signal Core_Sel. The core selection signal Core_Sel indicates the core selected by the core selection instruction. If the system debugging instruction is a group setting instruction, then the instruction decoder 526 stores the group setting of the group setting instruction. If the system debugging instruction is a synchronous start instruction, then the instruction decoder 526 outputs the group signal Group and the synchronous start signal Syn_Start, wherein the group signal Group reflects the contents of the group setting, which indicates which cores are included in the group set by the user.

The demultiplexer 528 receives the core debugging instruction from the system controller 524. In addition, when the demultiplexer 528 receives the core selection signal Core_Sel from the instruction decoder 526, it would send the core debugging instruction to a core which is selected by the core selection signal. The core debugging instruction decodes from the received core. Through the system controller 524 and the demultiplexer 528 transmitting the core debugging instruction, the test access port 522 is connected to each core as an exclusive test access port for each core. Thus, the system for multi-core synchronous debugging can integrate the test access ports of the cores to a single test access port. When the group signal Group and the synchronous start signal Syn_Start are received by the demultiplexer 528 and the instruction decoder 526, then a plurality of core start signals are simultaneously sent to all the cores in the group in order to notifying the cores of the group to simultaneously start executing their respective program instructions.

Figure 6:
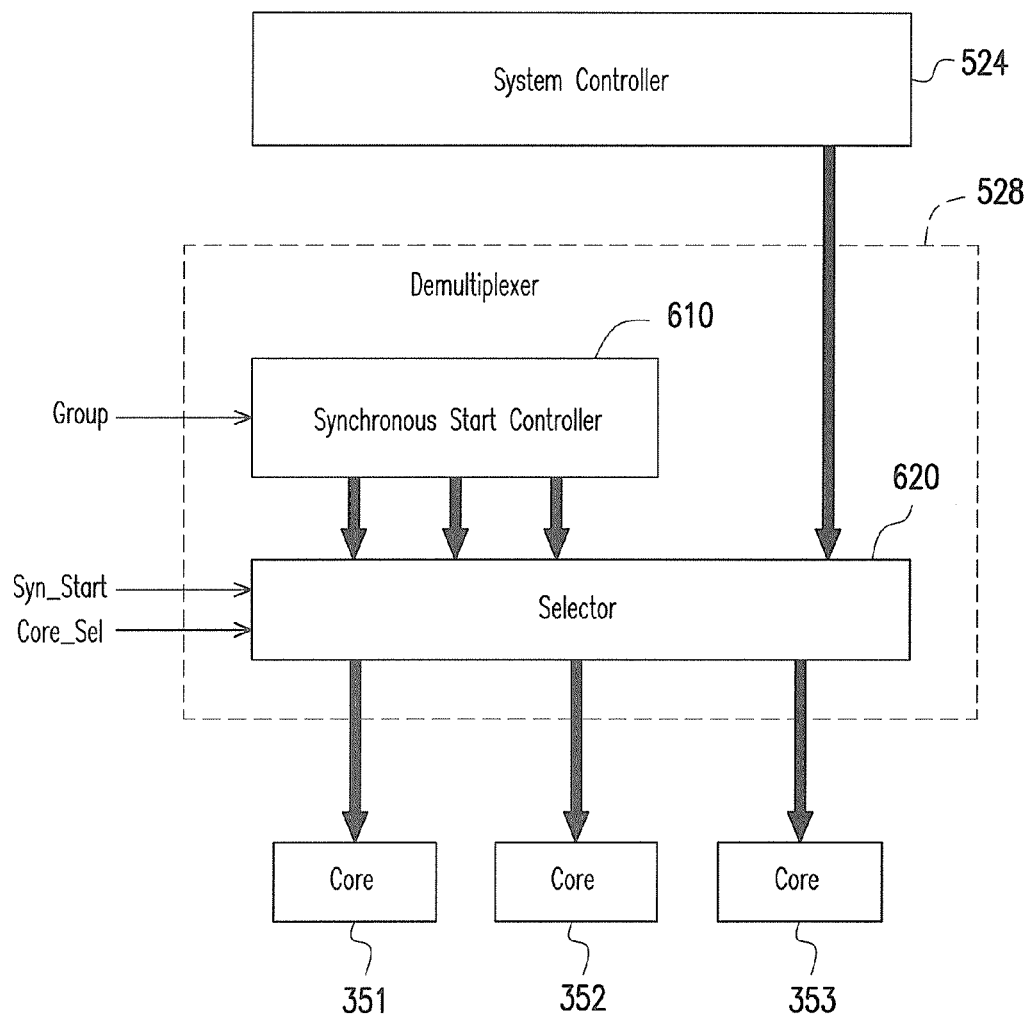
FIG. 6 is a schematic view of a demultiplexer according to FIG. 5 of an exemplary embodiment of the disclosure.

FIG. 6 is a structural schematic view of the demultiplexer 528 according to an exemplary embodiment of the disclosure. According to the exemplary embodiment, the demultiplexer 528 includes a synchronous start controller 610 and a selector 620.

The synchronous start controller 610 outputs each core start signal according to the group signal Group. There is a one-to-one correspondence between the core start signals and the cores of the group. Since the heterogeneous multi-core platform has different types of cores, each core start signal must satisfy the specification requirements of the corresponding core.

The selector 620 receives the core debugging instruction from the system controller 524, and receives the core start signals from the synchronous start controller 610. When the selector 620 receives the core selection signal Core_Sel from the instruction decoder 526, it then sends the core debugging instruction to a core selected by the core selection signal. When the selector 620 receives the synchronous start signal Syn_Start from the instruction decoder 526, it then sends each core start signal provided by the synchronous start controller 610 to the corresponding core.

Since each core standard is different, the core start signal of each core has a different bit number, causing a difference in input time. In order for all the cores of the same group to start synchronously, the demultiplexer 528 must control the sending sequence of each core start signal. For example, if the system 300 for multi-core synchronous debugging and the cores 351-353 both support the JTAG standard, then the demultiplexer 528 controls the sending sequence of each core start signal, so each core of the group simultaneously enters an instruction update state (Update-IR) of the JTAG standard. In this way, each core of the group simultaneously starts executing its respective program instructions.

Figure 7:
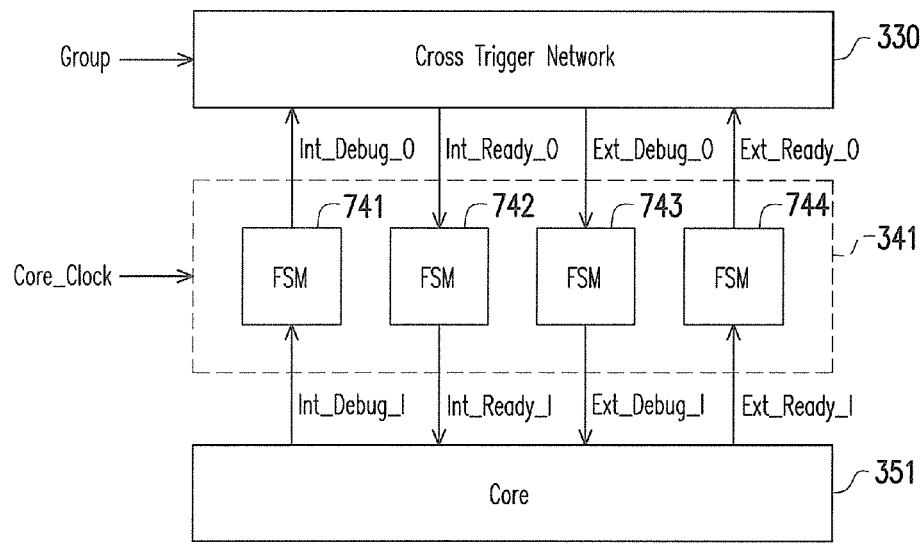
FIG. 7 is a schematic view of a cross trigger network according to FIG. 3 of an exemplary embodiment of the disclosure.

The cross trigger network 330 and the handshaking interfaces 341-343 handle the synchronization of the multi-core debug events. The signals relating to the debug events include a debug signal and a ready signal. However, the actual signal handshaking mechanism is more complicated. FIG. 7 is shown with the handshaking interface 341 and the core 351 as an example, to describe the signal handshaking mechanism. As shown in FIG. 7, the handshaking interface 341 and the cross trigger network 330 transmit four types of signals in between. The handshaking interface 341 and the corresponding core 351 also transmit four types of signals in between. The handshaking interface 341 includes four finite state machines (FSM) 741-744 responsible for the handshaking mechanism of the signal. These finite state machines use a clock signal Core_Clock of the core 351 to serve as the operating clock. The remaining handshaking interfaces can use a similar structure and a similar signal handshaking mechanism.

The handshaking interface 341 and the core 351 are used as an example to describe the entire process of a debug event handshaking mechanism. When a debug event happens in a core 351 of a group, the core 351 outputs a debug signal Int_Debug_I. The signal goes through the receiving of the handshaking interface 341, and becomes a debug signal Int_Debug_O. The cross trigger network 330 sends the debug signal Int_Debug_O to a handshaking interface corresponding to each of the remaining cores of the group according to the group signal Group, and becomes a debug signal Ext_Debug_O. When the handshaking interface 341 outputs the debug signal Int_Debug_O, the handshaking interface 341 maintains the debug signal Int_Debug_O until the handshaking interfaces corresponding to all of the remaining cores receive the debug signal Ext_Debug_O. In the exemplary embodiment, the handshaking interface 341 pulls down the debug signal Int_Debug_O only after the handshaking interfaces corresponding to each of the remaining cores send out a ready signal Ext_Ready_O in response to the reception of the debug signal Ext_Debug_O and the core 351 triggering the debug event receives a ready signal Int_Ready_I. This is because each core has a different clock frequency. The cores with higher clock frequency send shorter signal pulses. If the signal is not maintained, the other cores with lower clock frequency may miss the signal.

Next, the action of the handshaking interface of each remaining core depends on whether or not the remaining core needs to prepare for the debug mode. If the remaining core needs to prepare for the debug mode, then the corresponding handshaking interface sends the debug signal Ext_Debug_I to notify the remaining core of the external debug event. The remaining core sends out a ready signal Ext_Ready_I after entering the debug mode. The corresponding handshaking interface receives the ready signal Ext_Ready_I and then outputs the ready signal Ext_Ready_O to respond to the debug signal Ext_Debug_O. On the other hand, if the remaining core does not need to prepare for the debug mode, then the remaining core will not respond the ready signal. The corresponding handshaking interface sends the debug signal Ext_Debug_I to notify the remaining core of the external debug event, and then automatically outputs the ready signal Ext_Ready_O immediately to respond to the debug signal Ext_Debug_O. This way, even though the debug event processing mechanism of each core of a heterogeneous multi-core platform is different, a synchronous debugging effect can still be achieved.

Next, when the handshaking interfaces of each of the remaining cores all output the ready signal Ext_Ready_O, the cross trigger network 330 transmits the ready signal Ext_Ready_O to the handshaking interface 341, and the ready signal Ext_Ready_O is translated to the ready signal Int_Ready_O. When the handshaking interface corresponding to each of the remaining cores outputs the ready signal Ext_Debug_O, the handshaking interface maintains the state of the ready signal Ext_Debug_O until the handshaking interface 341 corresponding to the core 351 receives the ready signal Int_Ready_O. The handshaking interface 341 receives the ready signal Int_Ready_O and then outputs the ready signal Int_Ready_I to the core 351. When the core 351 receives the ready signal Int_Ready_I, it is confirmed that all the cores of the group have synchronously stopped and entered the debug mode, to let the user proceed to perform debug actions.

Figure 8:
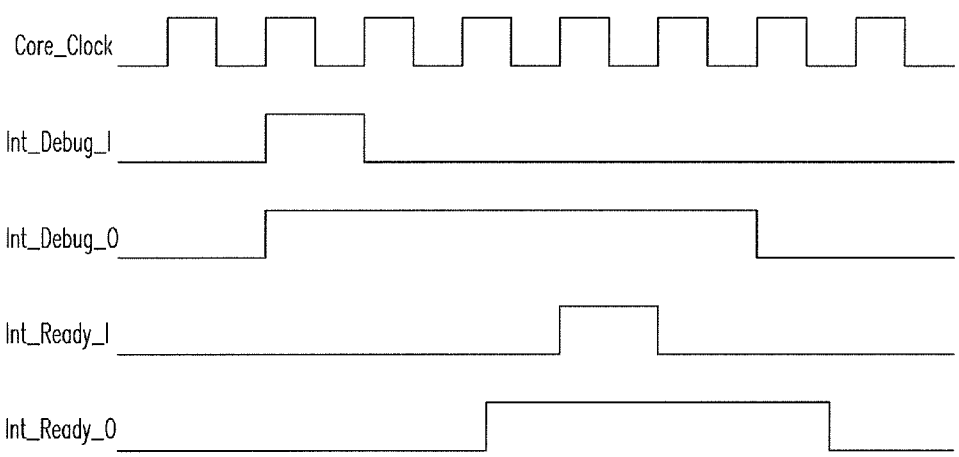
FIG. 8 is a schematic view of a core debug event handshaking mechanism according to an exemplary embodiment of the disclosure.

FIG. 8 shows an example of the timing sequence of the core clock signal Core_Clock, the debug signals Int_Debug_I, Int_Debug_O, and the ready signals Int_Ready_I, Int_Ready_O of the handshaking interface 341 in the handshaking mechanism. Referring to FIG. 8, the pulse of the debug signal Int_Debug_I is shorter, so the handshaking interface additionally maintains the debug signal Int_Debug_O when outputting the debug signal Int_Debug_O, extending the pulse until the core 351 receives the ready signal Int_Ready_I. After the core 351 receives the ready signal Int_Ready_I, the handshaking interface 341 pulls down the debug signal Int_Debug_O, and the handshaking interfaces of the remaining cores pull down the ready signal Ext_Ready_O, causing the cross trigger network 330 to set down the ready signal Int_Ready_O. FIG. 8 is only an example. The disclosure is not limited to the signal timing shown in FIG. 8.

To sum up, the disclosure provides a system and method for multi-core synchronous debugging of homogenous or heterogeneous multi-core platforms. The method can integrate existing debugging software and debugging hardware of cores and provide a unified multicore debugger system. The system and method provide a centralized user interface, along with multi-core debugging integration and synchronous multi-core debugging mechanism at both the software level and the hardware level. This reduces the production cost of the system for multi-core debugging, and improves user convenience.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A system for multi-core synchronous debugging of a multi-core platform including a plurality of cores, the system for multi-core synchronous debugging comprising:
a system debug wrapper module, wherein each of the cores corresponds to a debug software, and the system debug wrapper module provides a user interface to receive an operating instruction; wherein the system debug wrapper module outputs a system debugging instruction corresponding to the operating instruction and sets up a system enable signal; or the system debug wrapper module inputs the operating instruction to the debugging software corresponding to the core selected by the system debugging instruction, outputs a core debugging instruction generated by the debugging software, and clears the system enable signal;
a system debugging interface, transmitting the core debugging instruction to one of the cores selected by the system debugging instruction, storing a group setting included in the system debugging instruction, or controlling every core in a group to simultaneously start executing program instructions, according to the type of the system debugging instruction, wherein the group is a subset of the cores and the group setting indicates which ones of the cores are included in the group;
a plurality of handshaking interfaces, each of the handshaking interfaces corresponding to one of the cores, and providing a handshaking mechanism for a debug event between the cores; and
a cross trigger network, transmitting signals relating to the debug event between the handshaking interfaces corresponding to the group, wherein when the debug event happens in a core of the group, the handshaking interfaces and the cross trigger network use the handshaking mechanism to control all cores of the group to simultaneously enter a debug mode.

2. The system for multi-core synchronous debugging as claimed in claim 1, wherein the system debugging interface comprises:
a system controller, receiving the system debugging instruction, the core debugging instruction, and the system enable signal from the system debug wrapper module; when the system enable signal is set up, then the system controller outputs the system debugging instruction; when the system enable signal is cleared, then the system controller outputs the core debugging instruction;
an instruction decoder, receiving the system debugging instruction from the system controller and storing the group setting, decoding the system debugging instruction and outputting a core selection signal, a group signal, and a synchronous start signal, wherein the core selection signal indicates the core selected by the system debugging signal, and the group signal indicates which ones of the cores are included in the group; and
a demultiplexer, receiving the core debugging instruction from the system controller; wherein when the demultiplexer receives the core selection signal from the instruction decoder, the demultiplexer sends the core debugging instruction to the core selected by the system debugging instruction; wherein when the demultiplexer receives the group signal and the synchronous start signal from the instruction decoder, then the demultiplexer sends a plurality of core start signals simultaneously to all the cores in the group to notify each core of the group to simultaneously start executing program instructions.

3. The system for multi-core synchronous debugging as claimed in claim 2, wherein the demultiplexer comprises:
a synchronous start controller, outputting each of the core start signals according to the group signal, wherein each of the core start signals corresponds to one of the cores and satisfies the specification requirements of the corresponding core; and
a selector, receiving the core debugging instruction from the system controller, and receiving the core start signals from the synchronous start controller; wherein when the selector receives the core selection signal from the instruction decoder, the selector sends the core debugging instruction to the core selected by the system debugging instruction; wherein when the selector receives the synchronous start signal from the instruction decoder, then the selector sends the core start signals simultaneously to the corresponding cores.

4. The system for multi-core synchronous debugging as claimed in claim 2, wherein the system for multi-core synchronous debugging and the cores all support a Joint Test Action Group (JTAG) standard and the demultiplexer controls sending sequences of the core start signals so that each core of the group simultaneously enters an instruction update state of the JTAG standard and each core of the group simultaneously starts executing program instructions.

5. The system for multi-core synchronous debugging as claimed in claim 1, wherein the related signal of the debug event includes a debug signal and a ready signal; wherein when the debug event happens in a specific core of the group, the handshaking interface corresponding to the specific core outputs the debug signal; wherein the cross trigger network transmits the debug signal to the handshaking interface corresponding to each of the remaining cores of the group according to the group setting, and the handshaking interface outputs the ready signal to respond to the debug signal; wherein when the handshaking interfaces of the remaining cores all output the ready signal, the cross trigger network and the handshaking interface corresponding to the specific core transmits the ready signal to the specific core.

6. The system for multi-core synchronous debugging as claimed in claim 5, wherein
after the handshaking interface corresponding to each of the remaining cores receives the debug signal, if the remaining core needs to prepare for the debug mode, then the handshaking interface outputs the ready signal after the handshaking interface notifies the remaining core of an external debug event and the remaining core enters the debug mode;
after the handshaking interface corresponding to each of the remaining cores receives the debug signal, if the remaining core does not need to prepare for the debug mode, then the handshaking interface outputs the ready signal immediately after the handshaking interface notifies the remaining core of the external debug event.

7. The system for multi-core synchronous debugging as claimed in claim 5, wherein when the handshaking interface corresponding to the specific core outputs the debug signal, the debug signal is maintained until the handshaking interfaces corresponding to the remaining cores all receive the debug signal; wherein when the handshaking interface corresponding to each of the remaining cores outputs the ready signal, the ready signal is maintained until the handshaking interface corresponding to the specific core receives the ready signal.

8. A method for multi-core synchronous debugging of a multi-core platform including a plurality of cores, the method for multi-core synchronous debugging comprising:
- providing a user interface to receive an operating instruction, wherein each of the cores corresponds to a debugging software;
- outputting a first system debugging instruction corresponding to the operating instruction, or inputting the operating instruction to the debugging software corresponding to the core selected by the first system debugging instruction and outputting a core debugging instruction generated by the debugging software;
- transmitting the core debugging instruction to one of the cores selected by the first system debugging instruction, or storing a group setting included in the first system debugging instruction, according to the type of the first system debugging instruction;
- controlling every core in a group to simultaneously start executing program instructions according to a second system debugging instruction, wherein the group is a subset of the cores and the group setting indicates which ones of the cores are included in the group; and
- when a debug event happens in any one of the cores of the group, using a handshaking mechanism to control all cores of the group to simultaneously enter a debug mode.

9. The method for multi-core synchronous debugging as claimed in claim 8, further comprising:
- decoding the first system debugging instruction and the second system debugging instruction, and outputting a core selection signal, a group signal, and a synchronous start signal, wherein the core selection signal indicates the core selected by the first system debugging signal, and the group signal indicates which ones of the cores are included in the group;
- when the core selection signal is received, sending the core debugging instruction to the core selected by the first system debugging instruction; and
- when the group signal and the synchronous start signal are received, sending a plurality of core start signals simultaneously to all the cores in the group to notify each core of the group to simultaneously start executing program instructions.

10. The method for multi-core synchronous debugging as claimed in claim 9, wherein the step for simultaneously sending the core start signals to all the cores in the group comprises:
- outputting each of the core start signals according to the group signal, wherein each of the core start signals corresponds to one of the cores and satisfies the specification requirements of the corresponding core; and
- when the synchronous start signal is received, sending the core start signals simultaneously to the corresponding cores.

11. The method for multi-core synchronous debugging as claimed in claim 9, wherein the step for simultaneously sending the core start signals to the corresponding cores comprises:
- controlling a sending sequence of each of the core start signals so that each core of the group simultaneously enters an instruction update state of a Joint Test Action Group (JTAG) standard.

12. The method for multi-core synchronous debugging as claimed in claim 8, wherein signals relating to the debug event include a debug signal and a ready signal, and the step of using the handshaking mechanism to control all the cores of the group to simultaneously enter the debug mode comprises:
- when the debug event happens in a specific core of the group, the specific core outputting the debug signal;
- transmitting the debug signal to a handshaking interface corresponding to each of the remaining cores of the group according to the group setting;
- the handshaking interface outputting the ready signal to respond to the debug signal; and
- when the handshaking interfaces of the remaining cores all output the ready signal, a handshaking interface corresponding to the specific core transmits the ready signal to the specific core.

13. The method for multi-core synchronous debugging as claimed in claim 12, wherein the step of the handshaking interface corresponding to each of the remaining cores outputting the ready signal to respond to the debug signal comprises:
- after the handshaking interface receives the debug signal, if the corresponding remaining core needs to prepare for the debug mode, the handshaking interface outputting the ready signal after the handshaking interface notifies the remaining core of an external debug event and the remaining core enters the debug mode; and
- after the handshaking interface receives the debug signal, if the corresponding remaining core does not need to prepare for the debug mode, the handshaking interface outputting the ready signal immediately after the handshaking interface notifies the remaining core of the external debug event.

14. The method for multi-core synchronous debugging as claimed in claim 12, further comprising:
- when the handshaking interface corresponding to the specific core outputs the debug signal, maintaining the debug signal until the handshaking interfaces corresponding to each of the remaining cores all receive the debug signal; and
- when the handshaking interface corresponding to each of the remaining cores outputs the ready signal, maintaining the ready signal until the handshaking interface corresponding to the specific core receives the ready signal.

* * * * *